United States Patent [19]
Wilkins

[11] Patent Number: 5,975,104
[45] Date of Patent: Nov. 2, 1999

[54] BALL VALVE SEAL REPLACEMENT APPARATUS AND METHOD

[75] Inventor: Larry C. Wilkins, New Albany, Ind.

[73] Assignee: Electromechanical Research Laboratories, Inc., New Albany, Ind.

[21] Appl. No.: 09/061,503

[22] Filed: Apr. 16, 1998

[51] Int. Cl.⁶ .................................................. F16K 43/00
[52] U.S. Cl. .......................... 137/15; 29/213.1; 29/221.6; 137/315
[58] Field of Search ..................... 137/15, 315; 29/213.1, 29/221.6, 281.1, 281.5, 281.6, 464, 402.02, 402.03

[56] References Cited

U.S. PATENT DOCUMENTS

| | | | |
|---|---|---|---|
| 2,746,470 | 5/1956 | Laird | 137/15 |
| 2,867,034 | 1/1959 | Bowman | 29/213.1 |
| 3,171,429 | 3/1965 | Sturmer et al. | 137/315 |
| 3,388,450 | 6/1968 | Forsman | 29/213.1 |
| 3,535,765 | 10/1970 | Denehie | 29/213.1 |
| 3,771,545 | 11/1973 | Allen | 137/315 |
| 3,920,036 | 11/1975 | Westenrieder | 137/315 |
| 4,151,855 | 5/1979 | Levin et al. | 137/15 |
| 4,175,577 | 11/1979 | Kacal et al. | 137/15 |
| 4,262,691 | 4/1981 | Kacal | 137/315 |
| 4,390,039 | 6/1983 | Johnson et al. | 137/315 |
| 4,566,482 | 1/1986 | Stunkard | 137/315 |
| 4,641,681 | 2/1987 | Ikematsu et al. | 137/315 |
| 4,718,444 | 1/1988 | Boelte | 137/15 |
| 4,875,523 | 10/1989 | Thornburrow | 137/315 |

FOREIGN PATENT DOCUMENTS

| | | | |
|---|---|---|---|
| 1215159 | 12/1970 | United Kingdom | 137/315 |

*Primary Examiner*—George L. Walton
*Attorney, Agent, or Firm*—Woodard, Emhardt, Naughton Moriarty & McNett

[57] ABSTRACT

While fluid pressure is present on the upstream side of a ball valve assembly, a jig is mounted to the downstream flange of the ball valve assembly. The jig has two hinged arms. A jack-screw pad engages the ball while one or the other of the arms is positioned at the screw and urged by a jam nut on the screw to force the pad against the valve ball to seal it on the inboard valve seal. Then the outboard seal is removed and replaced during sequential use of the hinged arms to keep the inboard seal holding pressure on the upstream side.

8 Claims, 12 Drawing Sheets

BALL VALVE SEAL REPLACEMENT APPARATUS AND METHOD

BACKGROUND OF THE INVENTION

1. Field of the Invention

This invention relates generally to ball valves, and more particularly to apparatus and a method for replacement of the downstream seal of such valves.

2. Description of the Prior Art

Ball valve assemblies are widely used in piping systems. Typically they have a valve body with a passageway through it and which opens at opposite flanged faces of the valve body, with the opening at the center of the face and a large flange with bolt receiving holes by which the valve body can be bolted to flange piping. Such valves are often used in a system in which the flow is usually in one direction from an upstream, higher pressure side to a downstream side. However, it is not uncommon for ball valves to be used in systems in which the pressure differential across the valve can be in opposite directions at different times.

When such valves are used on fittings to enable supply of material to or removal of material from a tank, such as on a tanker truck or railroad car, occasions arise when it is desirable to replace one or both seals. If the application is in a tanker wherein there is piping or a hose external to the valve assembly to supply material to the tank or remove it from the tank, but not always in place, it is desirable to be able to replace the outboard valve seal without emptying the tank. In other words, it is desirable to be able to replace the outboard seal even if there is pressure in the tank. Heretofore, to the best of my knowledge, that has not been possible in conventional ball valve assemblies, without removing the pressure from the tank. In many instances, has necessitated draining the product from the tank before seal replacement. Therefore, it is an object of the present invention to facilitate removal of the outboard seal from a ball valve assembly, and replacement of the seal, while the tank or plumbing line upstream of the valve body remains pressurized.

SUMMARY OF THE INVENTION

Described briefly, according to a typical embodiment of the present invention, a jig is mounted to the downstream flange of the valve body of a conventional ball valve assembly. The jig includes a mounting frame bolted to the flange and which has two independently movable, primary and secondary abutments pivotally mounted to the frame. A screw is provided with a torquing tool receiver at one end and a valve ball engagement pad at the other end, a couple of bearings on the screw shaft intermediate the ends, and a nut associated with each of the bearings. The screw is positioned with the pad engaging the ball and the screw is oriented with its axis along the axis of the valve body passageway sealed by the ball. With the primary abutment in place, centered on the axis of the screw, the primary bearing is placed against the abutment, between the pad and the abutment and, while holding the screw head from rotating, the primary nut is turned on the screw to jam the nut against the bearing and thereby force the pad on the ball and thereby force the ball against the inboard valve seal, whereby the ball will seal against the inboard valve seal and will hold pressure upstream of the valve. Then the outboard valve seal retainer ring is removed and so is the outboard valve seal, up to a position above the secondary bearing and nut. Then the secondary abutment is swung into place adjacent the screw axis and under the retainer and valve seal and above the valve ball. The secondary bearing is moved against the secondary abutment and, while holding the screw from rotating, the secondary nut is turned into position bearing against the secondary bearing. The nut is further turned while the screw is held from rotation, to jam the secondary bearing against the secondary abutment and simultaneously apply additional force to hold the valve ball on the inboard seal. At this time, of course, the outboard seal retainer ring and the removed outboard ball seal and retainer seal have been placed in position between the secondary and primary abutments. Then, with the secondary abutment secure in place and retaining the ball against the inboard seal, the primary nut is loosened and the primary abutment is swung out of place. Then the seal retainer ring and outboard seal are removed from the tool receiver end of the screw. A new seal is installed on the screw followed by the seal retainer ring. Then the primary abutment is swung back into place, and the primary nut and bearing are tightened against it to again apply axial force on the screw. This is followed by loosening the secondary nut, swinging the secondary abutment out of place and installing the new seal in the valve body against the ball. Then the seal retainer ring is installed in the valve body to hold the new outboard seal snugly against the ball. Then the primary nut can be loosened, the primary abutment swung out of the way, and the screw removed. Then the frame can be removed and any downstream piping can be re-installed on the downstream flange.

DESCRIPTION OF THE PREFERRED EMBODIMENT

Figure 1:
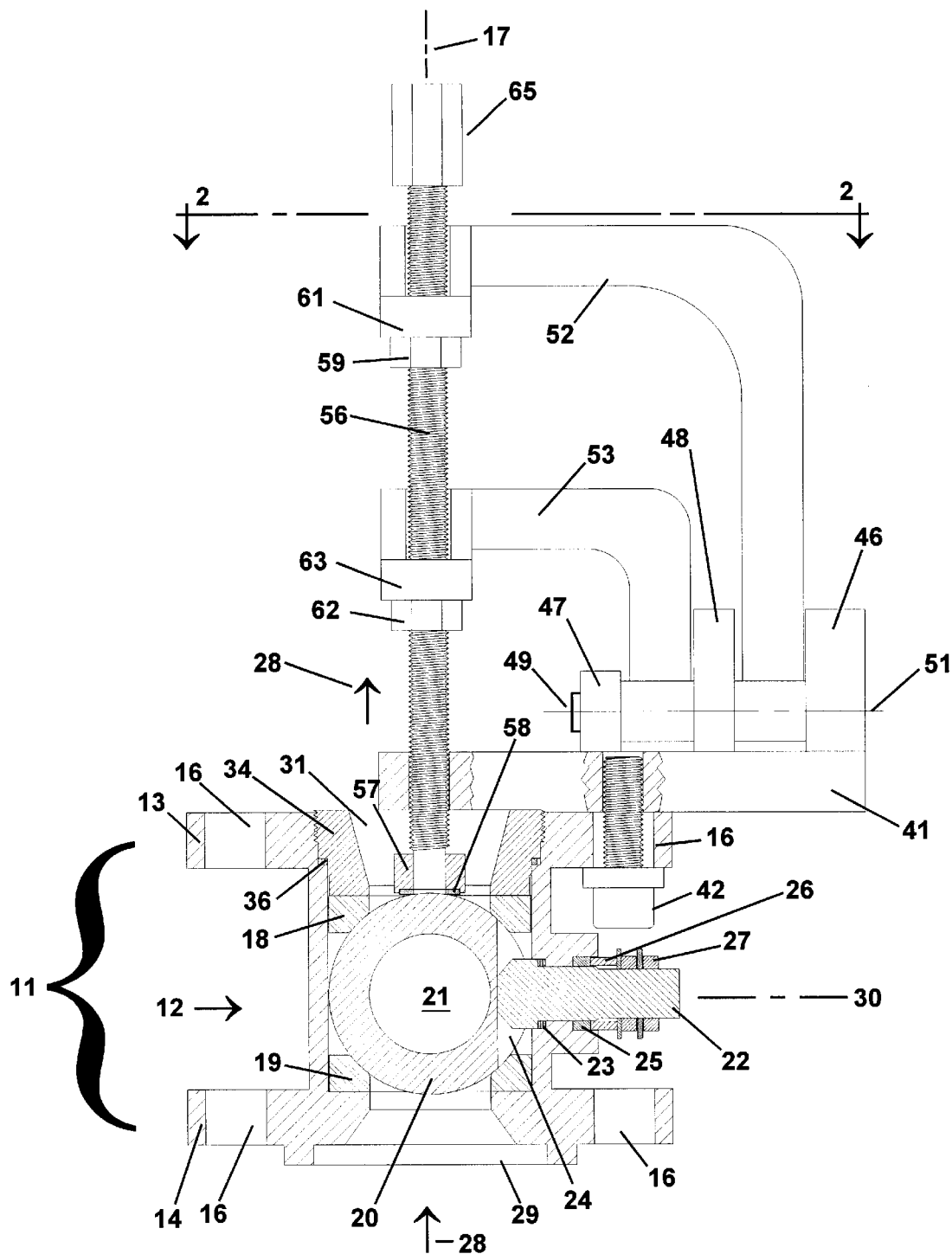
FIG. 1 is a side elevational view of the apparatus of the present invention mounted on a ball valve assembly shown in axial section.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, and particularly FIG. 1, a valve body assembly designated by bracket 11 is of typical construction including the valve body itself 12, having upper and lower flanges 13 and 14, having four bolt holes such as 16 (FIG. 2) circularly spaced around the axis 17. These flanges are arranged for assembly with pipe flanges on components as of pipes in a piping system, with appropriate seals between the valve body flanges and the associated pipe flanges as is well known in the art.

While there is a considerable variety of ball valve assemblies available, the one illustrated here is somewhat simplified simply for purposes of example. It has two units 18 and 19 in it, each of which can serve as both a ball seal and a ball bushing. The first seal 18 is received on top of the ball 20 in the main bore of the valve body. The second seal 19 is received under the ball and rests on the bottom of the bore.

The valve ball 20 is shown in the closed position with the aperture 21 thereof transverse to the axis 17 of the valve body bore. The operating stem 22 for the valve ball is inserted in the valve body from inside the main bore before the valve ball 20, with inboard stem seals 23 received in the stem head retainer counterbore. The valve ball has a slot 24 receiving the squared head of the stem 22. Packing 25 at the outboard region of the stem is engaged by the stem collar 26 and can be tightened by the inboard nut and washer combination 27 threaded on the stem 22. The inboard washer has flats matching the flats on the stem. The adjustment can be secured by tightening the outboard nut and washer combination on the stem.

As suggested above, the particular construction of the valve assembly is not the invention, so is only illustrated schematically. Upon loosening the nuts on the valve shaft, the ball can be turned 90° about the stem axis 30 to place the aperture 21 in the passage for flow of fluid in the direction of arrow 28 from the inlet opening 29 to the outlet opening 31 of the valve assembly.

Figure 3:
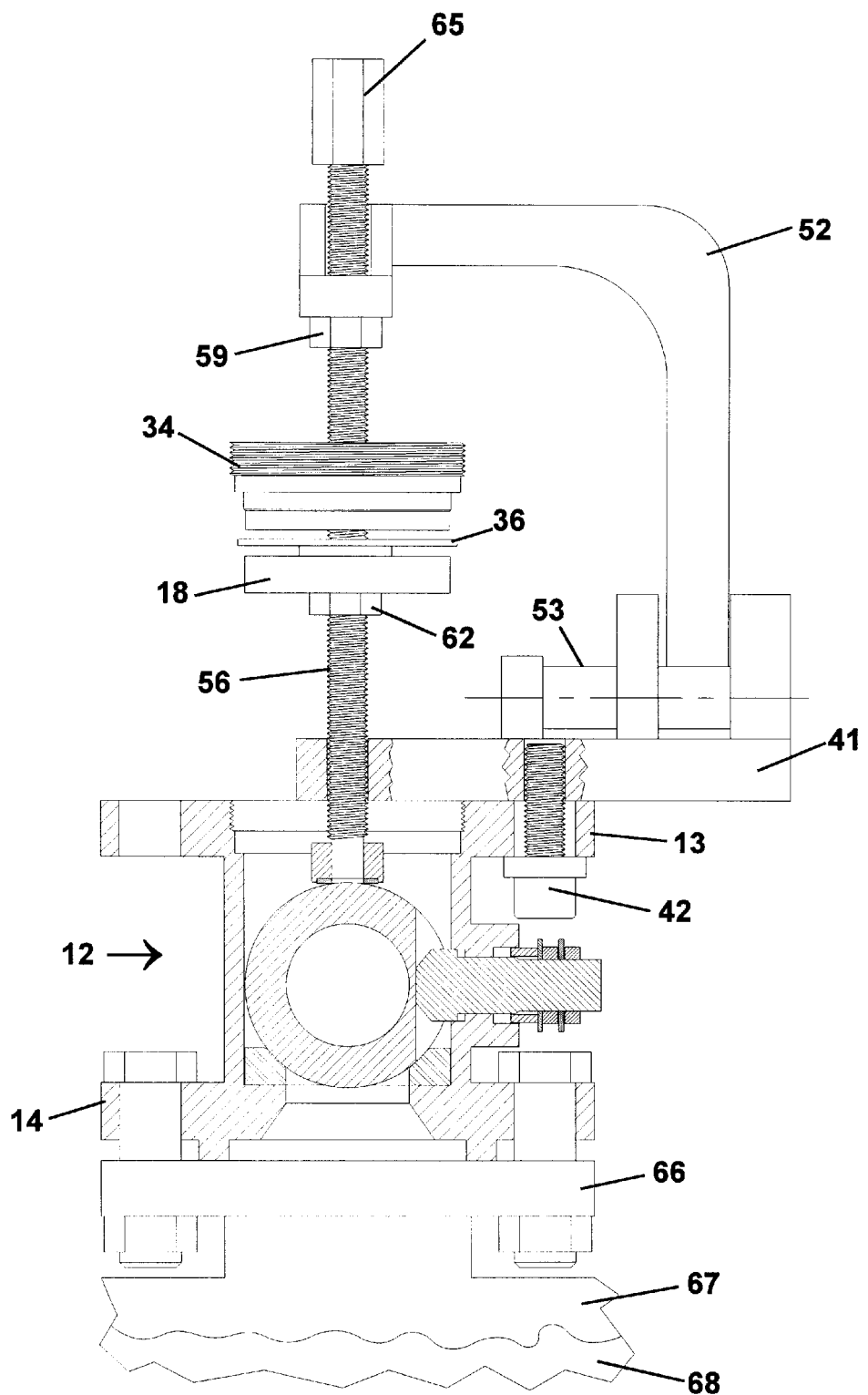
FIG. 3 is a view similar to FIG. 1 showing the ball seal retainer, the retainer seal and the valve ball seal removed from the valve body.

To facilitate understanding of the utility of the invention, and as only an example, consider as in FIG. 3, that the flange 14 is mounted to a pipe flange 66 on a tank 67 containing a liquid 68 or gas under pressure. While the invention is useful regardless of the attitude of the ball valve assembly, it is shown in an upright attitude to facilitate description. The terms such as "above" and "below" should not be construed as limiting the usefulness of this invention to a ball valve assembly only when disposed as shown in the illustrations herein.

With the foregoing in mind, and assuming that the flange 14 is mounted to a flange on a pipe or vessel at a higher pressure than a pipe or container mounted to flange 13, and since the tendency of liquid or vapor contents under such conditions would be to pass in the direction of arrows 28, flange 14 will be referred to as the inlet flange with the lower face thereof being the inlet face. Similarly, flange 13 will be referred to as the downstream flange and the top face of that, the downstream face. Valve seal 18 is the outboard, high pressure seal, and seal 19 is the inboard, low pressure seal, in this context. These seals may be identical, and may be made of a low friction sealing material of Teflon brand or other suitable material such as well known in the art.

Under normal operating conditions, the seal 18 is holding the pressure in the tank or fitting at the flange 14, while seal 19 may merely serve in a somewhat floating role as a bushing for the valve ball 20. Seal 18 is retained in the bore 33 by a seal retainer ring 34 which is screwed into the outlet face of the valve body. A retainer seal ring 36 prevents leakage out along the ring 34 threads when the valve is open. Because it is the seal 18 which prevents leakage of the vapor, gas, or contents in the piping or vessel connected to flange 14, it is most important that it properly seal against the ball when the valve is closed. Therefore, if it becomes worn or damaged, it must be replaced.

Normally, it is necessary to remove the pressure from the ball valve assembly in order to replace valve seal 18. In many applications, that is not convenient, especially if there are no other upstream valves, or if this valve assembly is associated with a vessel and is at an elevation lower than a liquid product contained in the vessel. Therefore, the present invention provides a way to change the seal 18 without removal of pressure from the upstream side.

Figure 2:
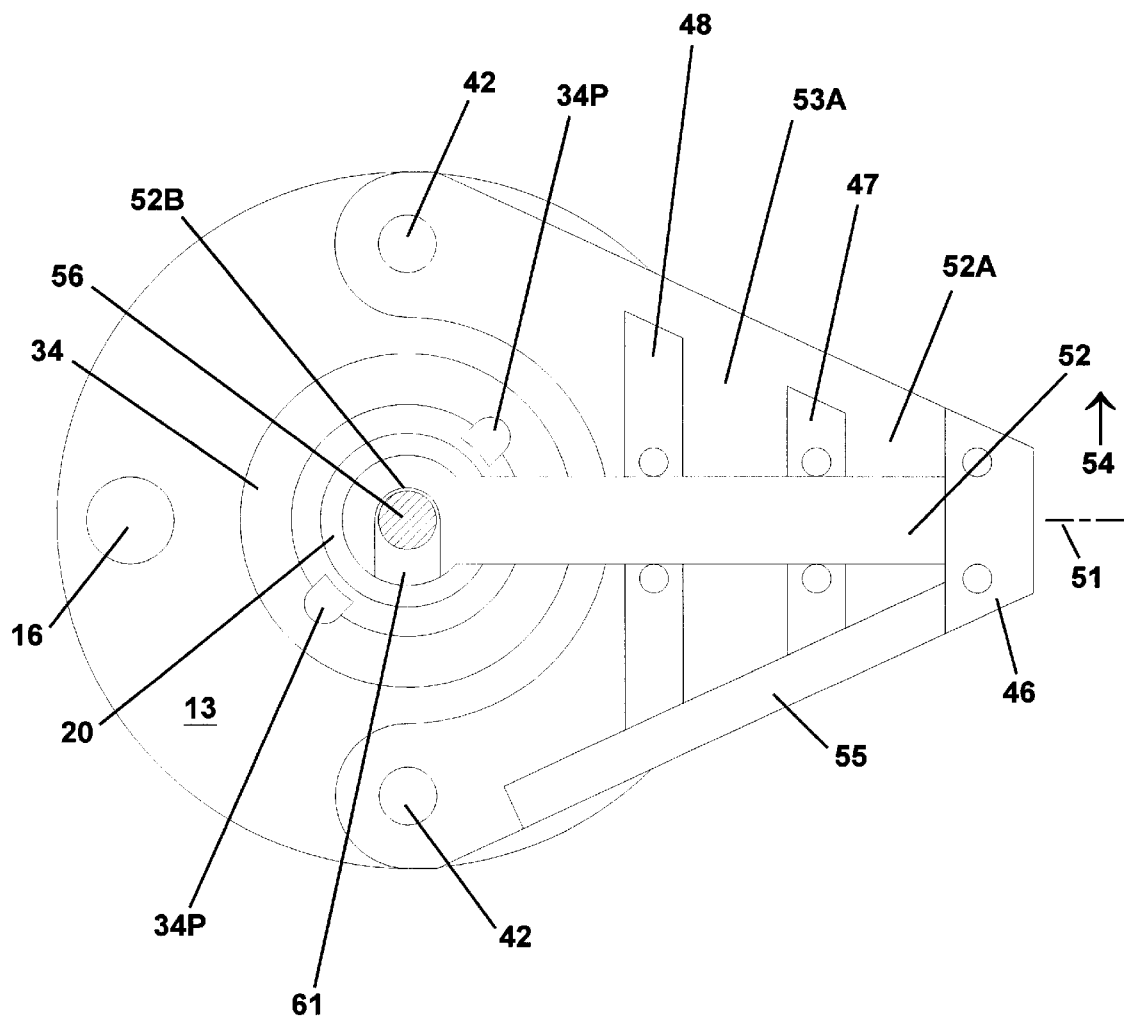
FIG. 2 is a top plan view thereof taken at line 2—2 in FIG. 1, viewed in the direction of the arrows and omitting the head end of the jam screw.

The apparatus according to the present invention includes a frame having a base 41 fastened to flange 13 by three cap screws 42 received through three of the four bolt holes 16 and screwed into the base 41. The base has three mounts 46, 47 and 48 for a shaft 49 having an axis 51. This shaft serves as a pivotal mounting for a primary abutment arm 52 and a secondary abutment arm 53, both of which are an inverted L-shape, and each of which can be pivoted down in the direction of arrow 54 (FIG. 2) from the upright position shown in FIG. 1 to a horizontal position resting on the top of the base 41 at 52A and 53A, respectively (FIG. 2).

A jam screw 56 has a socket 57 swivel mounted at the lower end and with a ring-shaped pad 58 made of a non-marring material engageable with the valve ball 20 and self-centering on the ball. There are two washer and nut combinations mounted on the screw. The primary combination includes the nut 59 and washer 61. The secondary combination includes the nut 62 and washer 63. The washers serve as bearings between the nuts and the bottom face of the distal end of the respective abutment arm. The distal end of each of the primary and secondary arms 52 and 53, respectively, is formed with a yoke as at 52B in FIG. 2, which is generally U-shaped and close to the screw 56, but enables the arm to be swung down by moving it in the direction of arrow 54 about the axis 51, while the screw 56 remains in line with the valve passageway axis which, in the illustrated embodiment, is perpendicular to the bolt flange faces.

Referring now to FIGS. 1 and 3, the valve body assembly is bolted to the flange 66 of the railroad tank car 67 shown fragmentarily and having a volatile material 68 therein. In FIG. 3, the seal 18 has been pulled out using the apparatus and method of the present invention. For that purpose, after bolting the base 41 to flange 13, the secondary arm 53 is lowered onto the top 53A of the base by moving it in the direction of the arrow 54 (FIG. 2). The primary arm 52 is tightly engaged with the upper (primary) bearing washer 61 by screwing the primary nut 59 up on the screw 56, while the tool receiving head 65 is held with a wrench or otherwise, so that the screw 56 and lower end pad 58 does not turn, and the nut 59 can be tightened. As it does so, the screw is driven down tight against the ball 20, pushing it tightly against the seal 19, whereby both the ball and the shoulder 23 are tightly engaged by the seal 19 and thereby seal the valve body to the tank car and will hold any pressure therein from leaking past the ball, either upwardly in the direction of arrow 28, or outwardly past the seal 23 and packing 25 in the direction of the ball actuating shaft axis 30. Then, the spanner wrench pockets 34P (FIG. 2) in the top of the retainer ring 34, are engaged by an appropriate standard tool to loosen and unscrew the retainer ring from the valve body.

After the retainer ring has been pulled out, it can be held up out of the way, while still encircling the screw 56, as the retainer ring seal 36 is pulled out of the valve body and then the valve seal 18 can be pulled out of the valve body. All three of these items remain trapped by the screw 56 and arm 52. Of course, the two seals 18 and 36 could be cut away from the screw, as they may be discarded anyway, but not the retainer ring 34.

Figure 5:
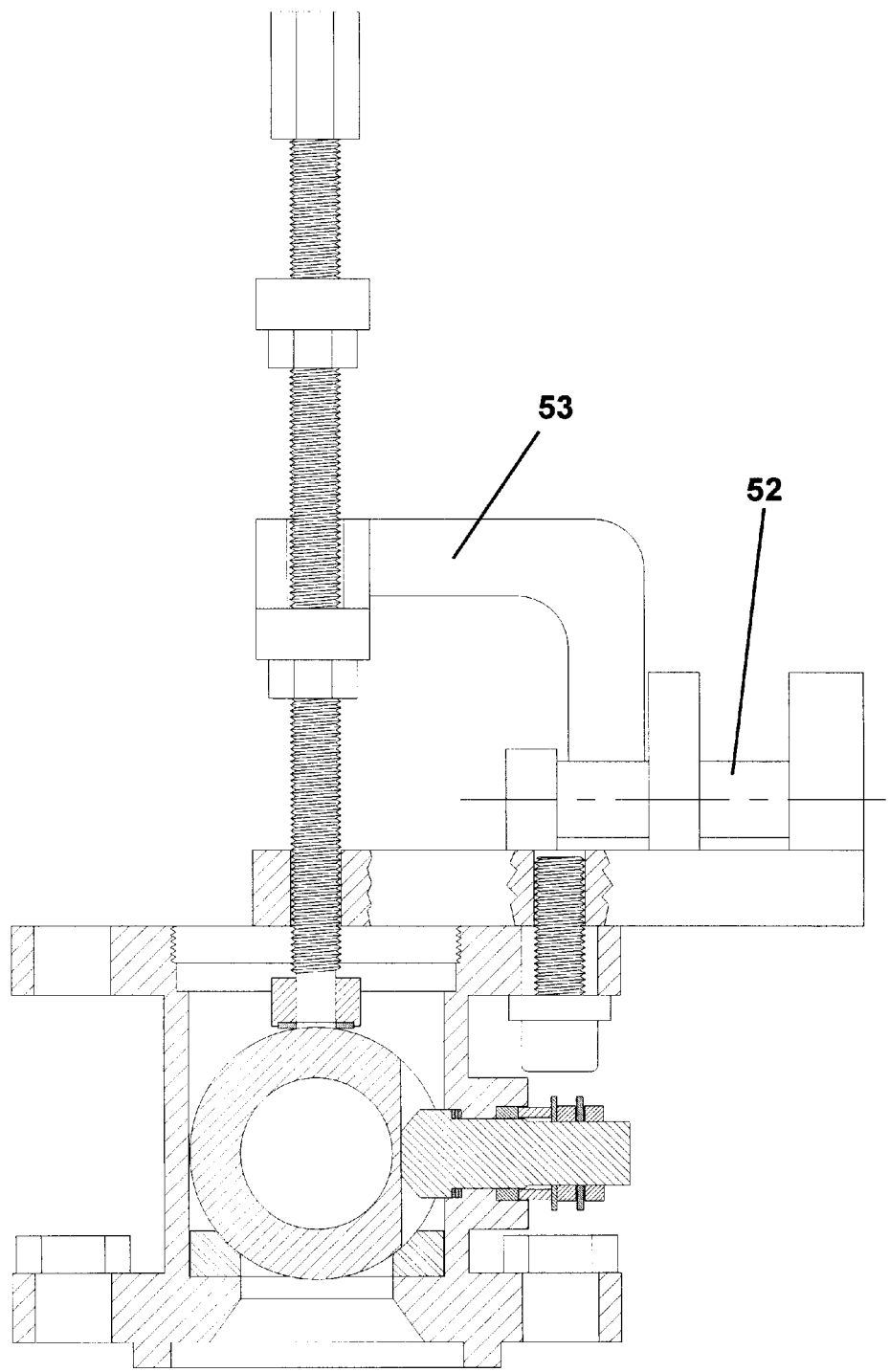
FIG. 5 is a view showing the apparatus after removal of the retainer, the retainer seal and ball seal from the jam screw.
Figure 6:
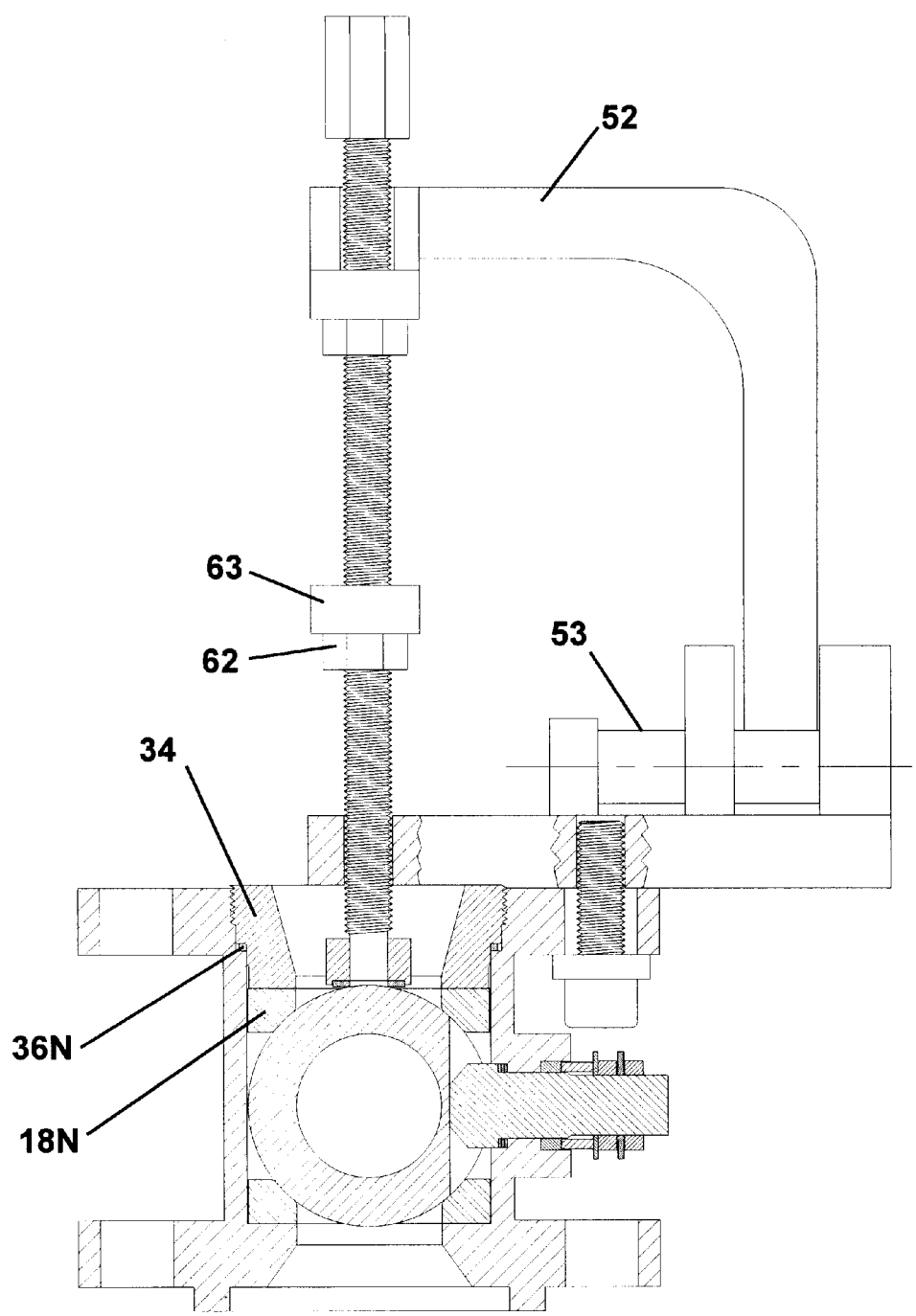
FIG. 6 is a view showing a new ball seal and retainer seal installed in the valve body.
Figure 7:
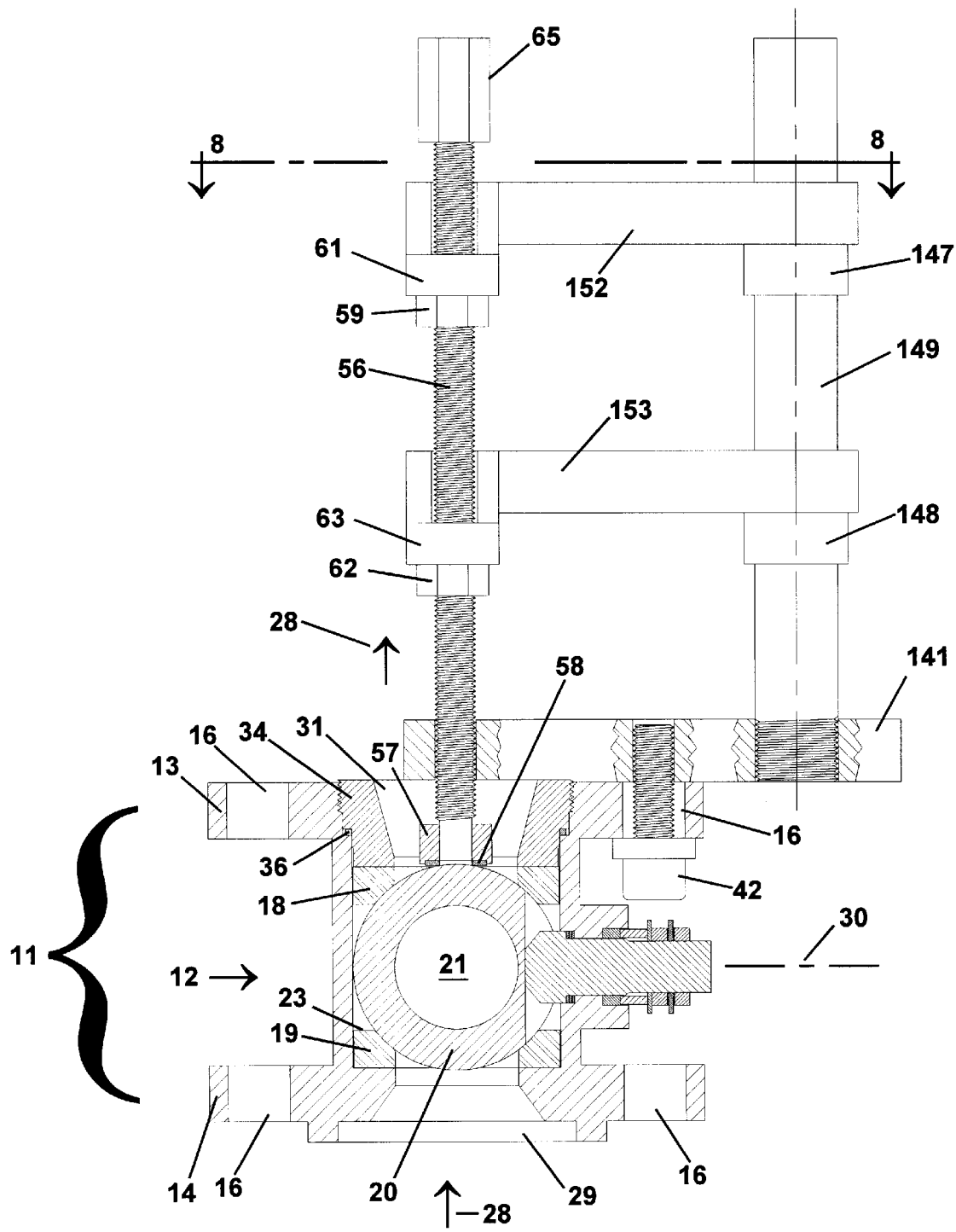
FIGS. 7–12 are like FIGS. 1–6 but for another embodiment of the invention.
Figure 8:
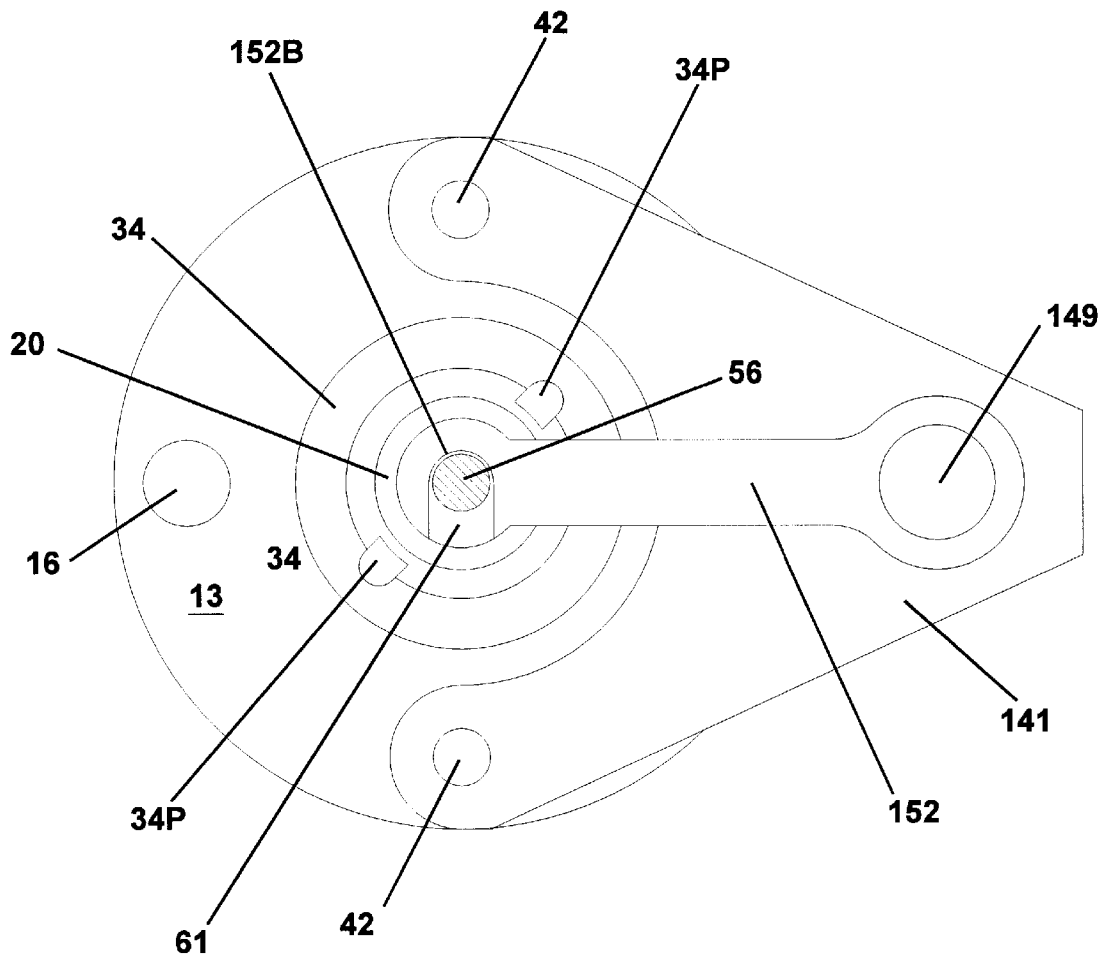
Figure 9:
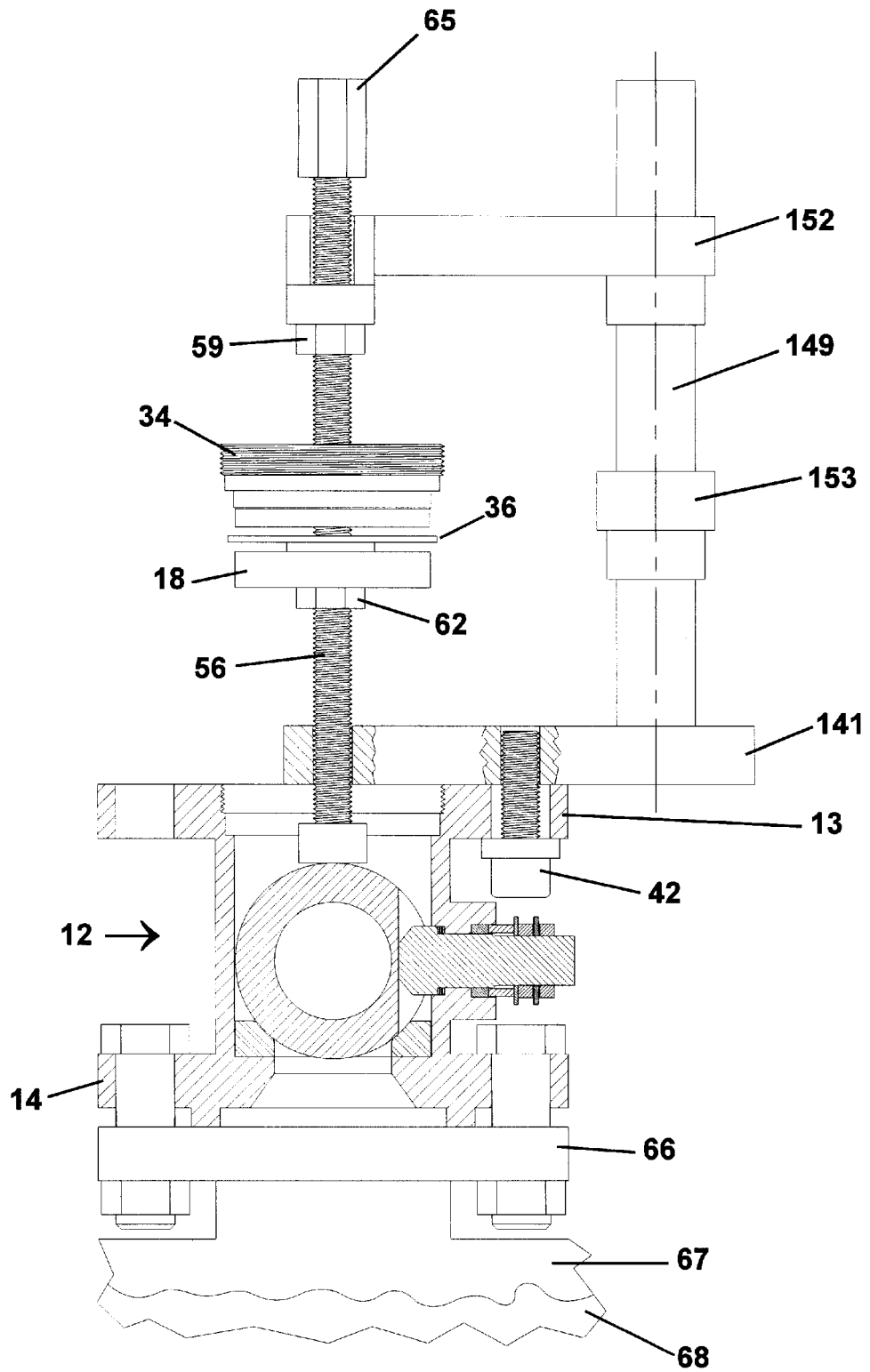
Figure 10:
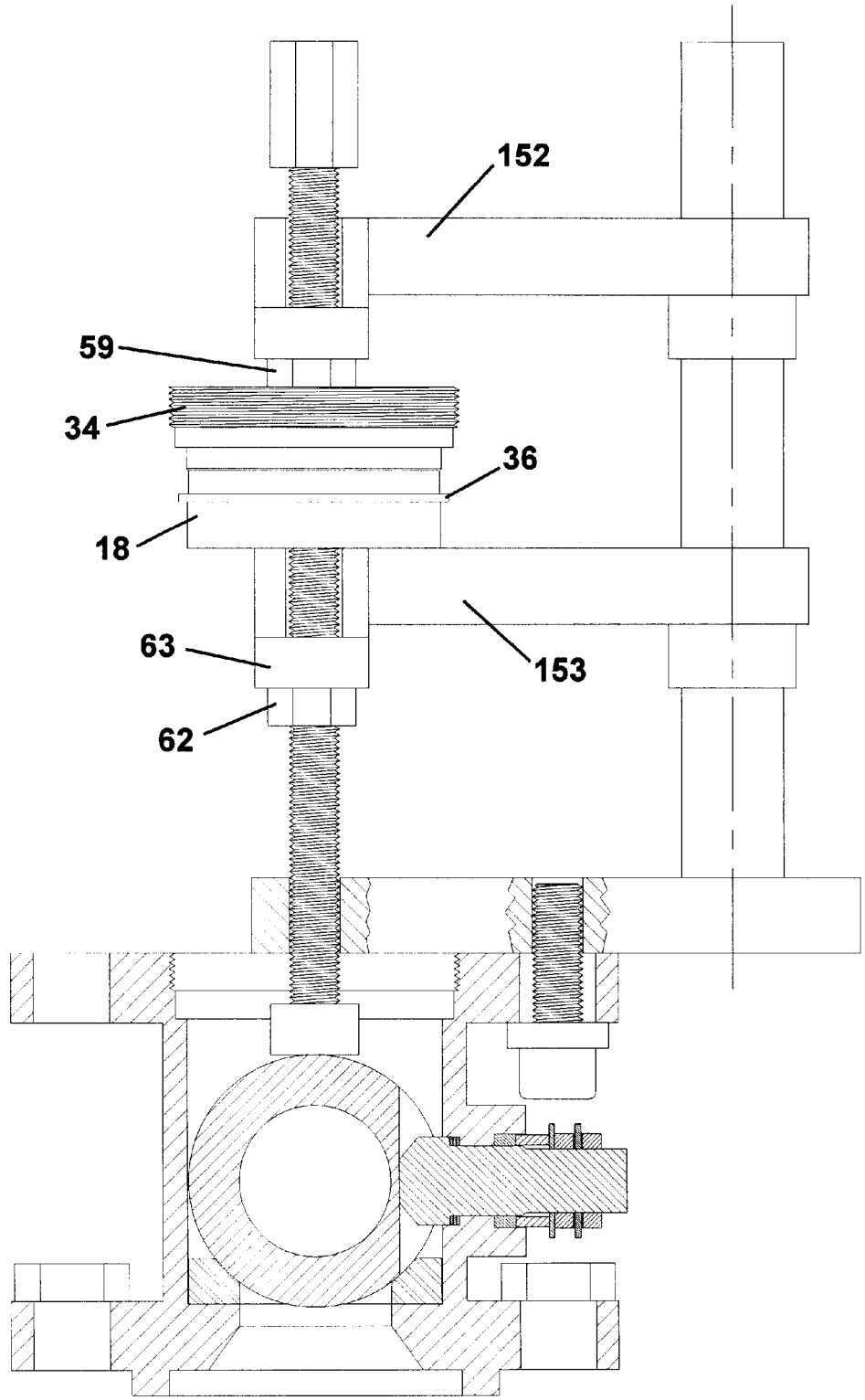
Figure 11:
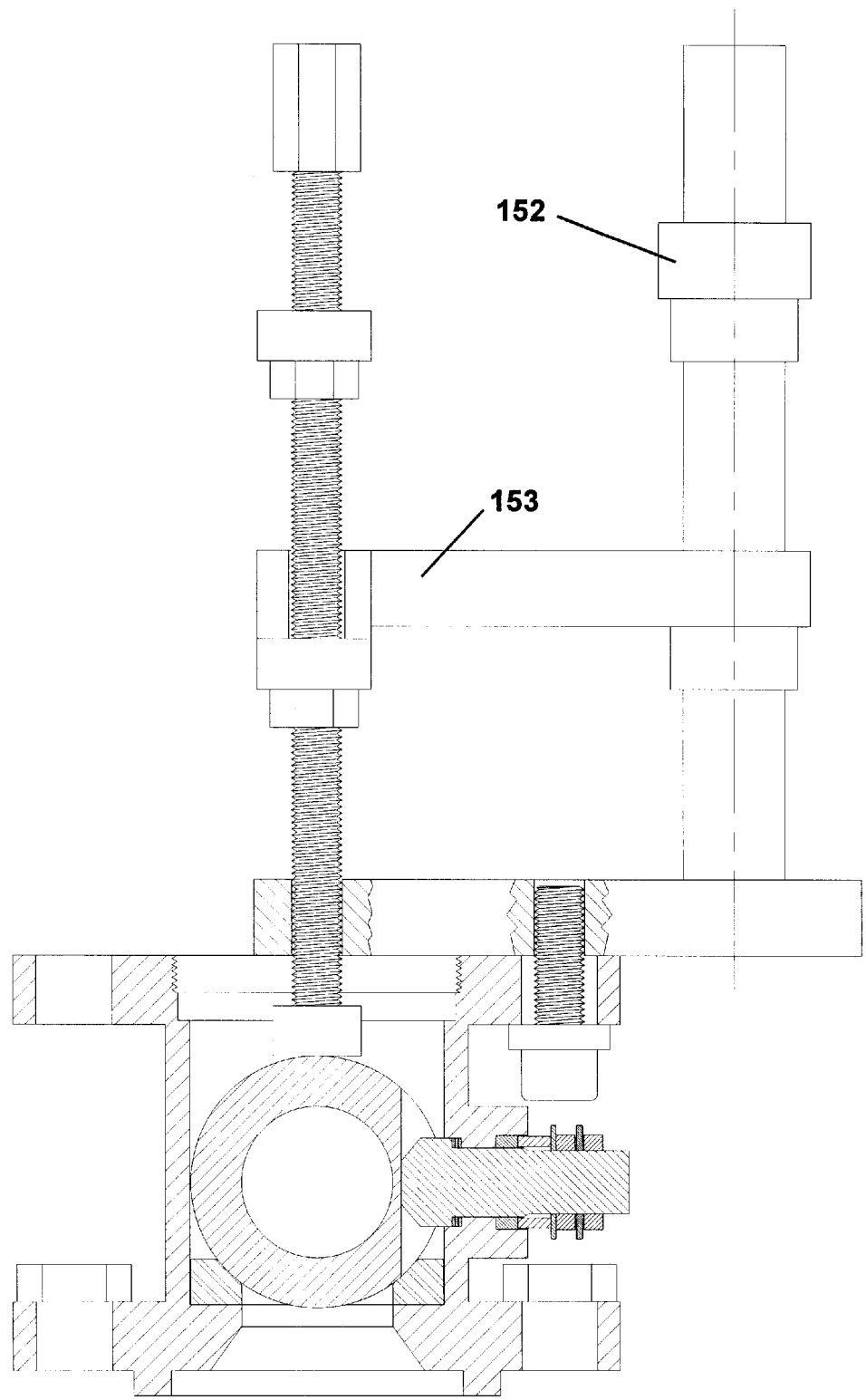
Figure 12:
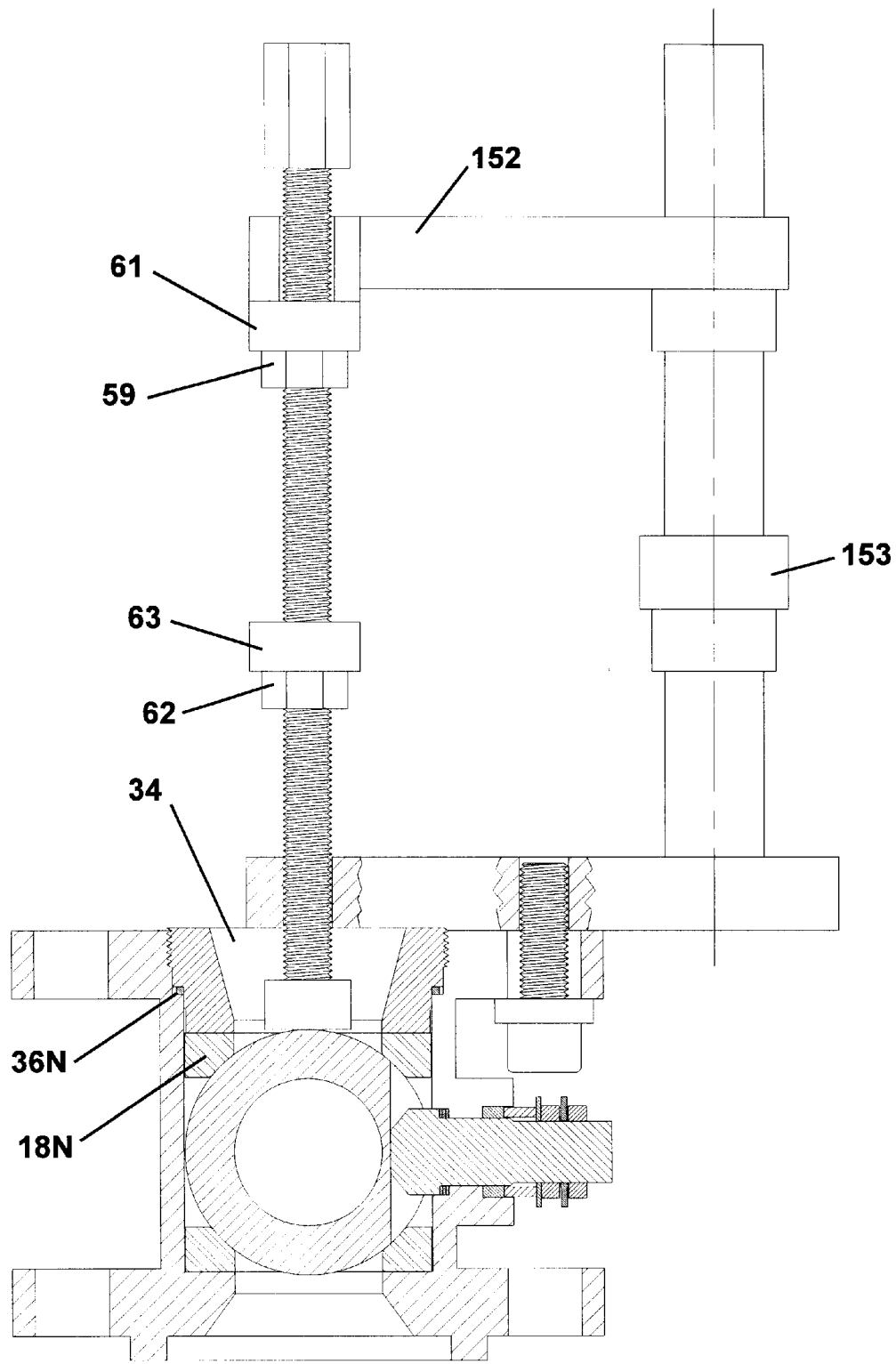

Then, with the three items held by a hand or wire or any convenient means, above the secondary nut and washer 62 and 63, the secondary arm 53 is swung back up about the axis 51 to place its yoke around screw 56. Then the secondary nut 62 is turned up against the secondary washer 63 and thereby jams the washer against the distal end of arm 53 as the screw head 65 is held against turning by a wrench or otherwise. As soon as enough force has been applied by jamming the nut 62 against the washer 63 to keep the valve ball 20 tightly engaged with the seal 19, the primary nut 59 can be screwed down on the screw while the head 65 is held by a wrench, enabling the primary arm 52 to be swung down in the direction of arrow 54 about the axis 49 to rest on the base top at 52A. This is the condition shown in FIG. 5 whereupon the retainer ring 34 and seals 36 and 18 can be pulled off the top of the screw 56 as shown in FIG. 5. It should be understood, of course, that both of the nut and washer combinations on screw 56 are small enough in overall diameter, for the inner circumferential surfaces of the seals 18 and 36, and retainer ring 34, to clear them as they are pulled up along the screw and over the nut and washer combinations.

Figure 4:
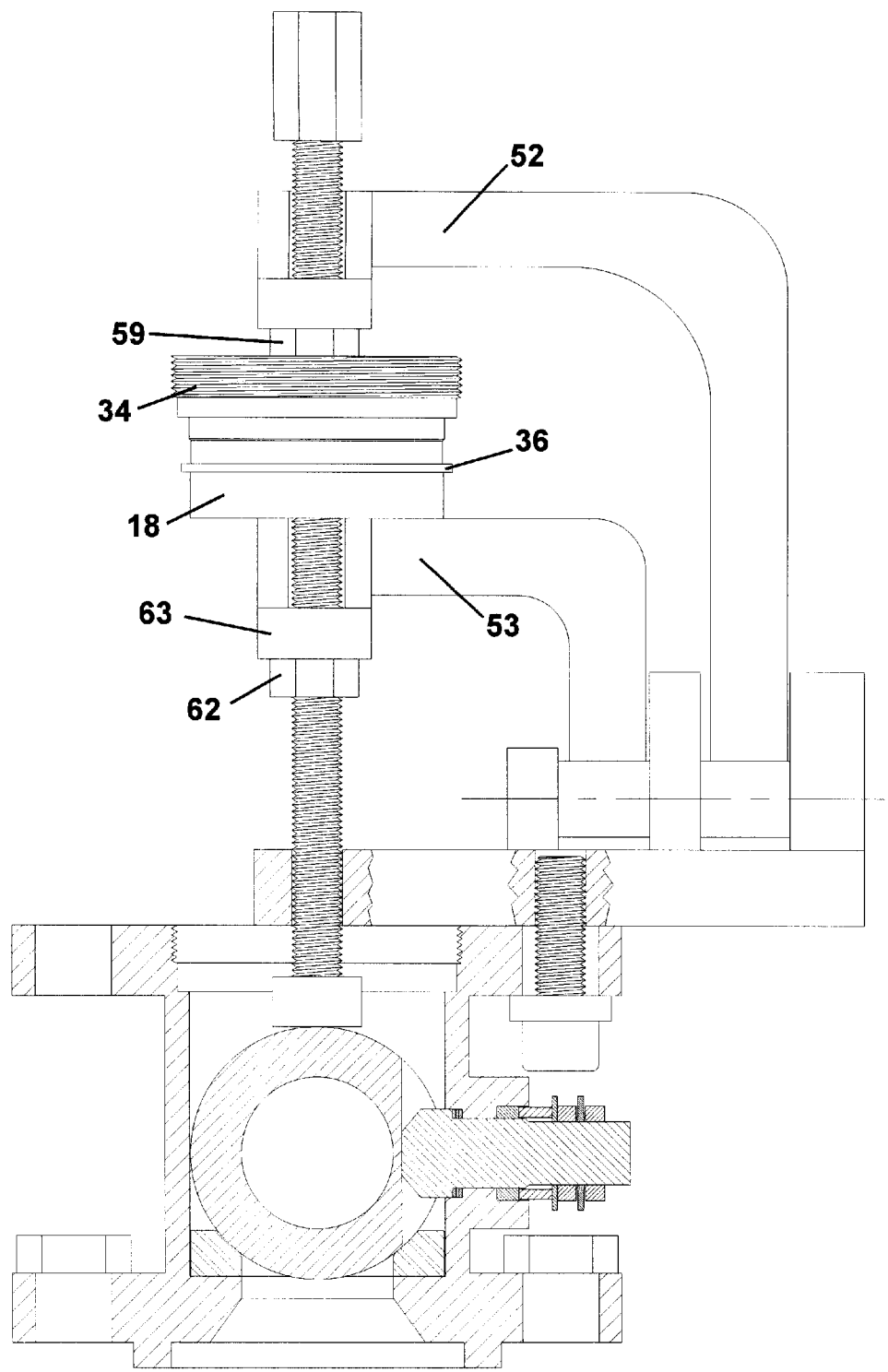
FIG. 4 is a similar view showing the step prior to removal from the jam screw.

Then, new seals 18N and 36N and the retainer ring 34 can be lowered over the screw head and down around the screw 56 to the same position as shown in FIG. 4 resting on top of the secondary arm 53. Then the primary arm 52 is raised again and the primary nut 59 is jammed up against the primary washer 61 against the primary arm to again apply sufficient force to hold the ball 20 against the inboard seal 19, so that the secondary arm 53 can again be released by turning the secondary nut 62 down on the screw and lowering the arm 53 in the direction of arrow 54 in FIG. 2. Then the two new seals can be lowered around the nut and washer combination 62, 63 and into the valve body, and the retainer ring 34 can follow and be screwed into the valve body to retain the seals in place. The retainer ring 34 again forces the new outboard valve seal 18N against the top of the valve ball so that, when the nut 59 is turned downward while the screw head 65 is held, the new seal 18N will assume the role of preventing escape of fluid or gas from the valve body in the direction of arrow 28. Then the arm 52 can be lowered and the jig base 41 can be removed from the flange 13. Then whatever piping solid or flexible, or fixture had been connected to it before, can be re-installed on the flange 13. Thus, the valve seal which normally prevents leakage from the high pressure side to the downstream side has been replaced without depressurizing or emptying the high pressure side of the system or the tank or whatever it is to which the flange 14 remains bolted.

It should be understood that, while the illustrated primary and secondary abutment arms are mounted to pivot on a horizontal axis, they could be reconfigured and mounted to swing about an axis parallel to the screw. An example of this construction is shown in FIGS. 7–12. In these views the components which are the same as in FIGS. 1–6, have the same reference numerals. Other components which are not necessarily the same but have similar functions, are given similar reference numerals but with the digit "1" in front. Post 149 is screwed into base 141 and has collars 147 and 148 supporting arms 152 and 153, respectively. The operating procedure is basically the same as described above.

The present invention is also useful to make it easy to replace valve stem packing 25 at the same time that the outboard valve ball seal is replaced, because the inboard ball seal is holding pressure away from the valve stem. If it is not necessary to replace the outboard ball seal, but is necessary to replace stem packing while the valve is pressurized, the present invention is useful. In that event, only one or the other of the abutment arms need be used.

With the foregoing in mind it should be recognized that, while the invention has been illustrated and described in detail in the drawings and foregoing description, the same is to be considered as illustrative and not restrictive in character, it being understood that only the preferred embodiments have been shown and described, and that all changes and modifications that come within the spirit of the invention are desired to be protected.

What is claimed is:

1. For use with a ball valve assembly having: a valve body including an inlet face with a mounting flange and an inlet, and an outlet face with a mounting flange and an outlet, and a passageway therethrough from the inlet to the outlet, and a valve ball in the passageway and operable to close the passageway thereby dividing the passageway into an inlet passageway and an outlet passageway, and first and second seals engaging the valve ball at the outlet passageway and the inlet passageway, respectively, and a seal retainer ring received in the outlet passageway and normally retaining the first seal against the valve ball in the body, the seals and retainer ring having colinear axes, and the body having mounting holes in the flanges, removal or insertion apparatus for replacing the first seal and comprising:

a base;

first and second arms selectively and pivotally mounted to the base, each of the arms being pivotally movable independent of the other arm and each having active and rest positions, and each of the arms having a distal end with a recess therein positionable at said axis when the respective arm is pivoted to its active position;

a screw having lower and upper ends and a longitudinal axis colinear with said axes, and having a pad at the lower end and having a tool receiver at the upper end and having two nuts threadedly received thereon and operable to load and hold the arms at the recesses when the arms are in their active positions for supplying sufficient force to said pad through said screw to hold said ball against said second seal to provide and maintain an effective seal at said inlet when said first seal and said retainer is being removed front or inserted into said valve body, the recesses on the distal ends of the arms being sized to receive the screw therein, whereby said first and second arms are selectively pivoted to said rest position when said first seal is to be removed from or inserted into said valve body along said screw and over said nuts.

2. A method of removing the first seal from the ball valve assembly of claim 1 and comprising the steps of:

attaching the mounting face of the base to the outlet face of the valve body;

placing the lower end of the screw on the valve ball;

placing the distal end of the first a arm directly above the ball;

placing the recess of the distal end of the first arm in position receiving the screw in the recess;

moving the first bearing against the bottom of the distal end of the first arm at the screw;

turning the nut while holding the screw to advance the nut upward on the screw to jam the screw pad against the ball and thereby jam the ball against the second seal to seal closed the inlet passageway;

removing the seal retainer ring from the valve body;

removing the first seal from the valve body;

placing the distal end of the second arm in position under the retainer ring and above the ball with the recess of the distal end of the second arm in position receiving the screw in said recess;

turning the second nut while holding the screw to advance the second nut upward on the screw to continue to jam the screw pad against the ball and thereby cooperate with the first arm and screw to jam the ball against the second seal to maintain second seal closure of the inlet passageway;

loosening the first nut enough to enable movement of the distal end of the first arm away from the screw while the second arm and screw continue to jam the ball against the second seal;

and removal of the retainer ring from the screw.

3. The method of claim 2 and further comprising the step of:

placing the first seal above the distal end of the second arm before moving the distal end of the second arm into position above the ball.

4. The method of claim 3 and further comprising the step of:

removing the first seal from the screw after removing the retainer ring from the screw.

5. The method of claim 2 and further comprising the step of:

removing the first seal from around the screw.

6. The method of claim 5 and further comprising the steps of:

installing a replacement seal on the screw above the distal end of the second arm while the second arm continues to jam the ball against the second seal;

re-installing the retainer ring on the screw above the replacement seal;

returning the distal end of the first arm into position over the ball and adjacent the screw and above the replacement seal and the retainer ring;

turning the first nut while holding the screw to advance the first nut upward on the screw to again enable the first arm to jam the screw pad against the ball and thereby cooperate with the second arm and screw to jam the ball against the second seal to continue to seal closed the inlet passageway;

loosen the second nut and move the distal end of the second arm away from the screw;

lower the replacement seal into position in the valve body against the valve ball; and return the retainer ring into position in the valve body against the replacement seal and sealingly engage the replacement seal with the valve ball.

7. The method of claim 6 and further comprising the steps of:

releasing the first nut and removing the screw.

8. The method of claim 7 and further comprising the step of:

removing the base from the outlet face of the valve body flange.

* * * * *